Aug. 27, 1963     M. E. BOWDISH     3,101,700
ROTARY COMPRESSOR OR ENGINE

Filed June 14, 1960     6 Sheets-Sheet 1

INVENTOR.
MEREDITH E. BOWDISH
BY
Reynolds, Beach + Christensen
ATTORNEYS

INVENTOR.
MEREDITH E. BOWDISH
BY Reynolds, Beach & Christensen
ATTORNEYS

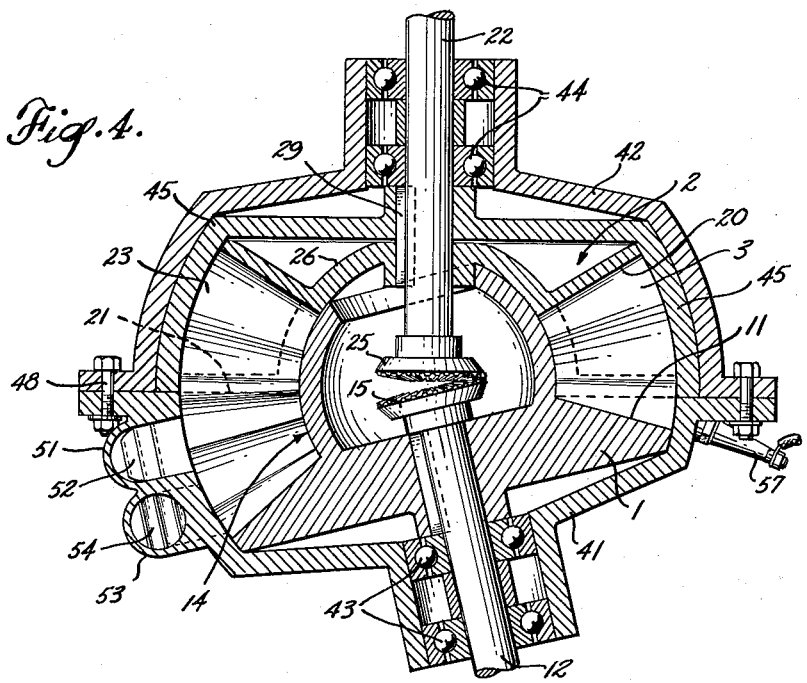

Aug. 27, 1963 M. E. BOWDISH 3,101,700
ROTARY COMPRESSOR OR ENGINE
Filed June 14, 1960 6 Sheets-Sheet 4

INVENTOR.
MEREDITH E. BOWDISH
BY
Reynolds, Beach & Christensen
ATTORNEYS

Aug. 27, 1963
M. E. BOWDISH
3,101,700
ROTARY COMPRESSOR OR ENGINE
Filed June 14, 1960
6 Sheets-Sheet 5
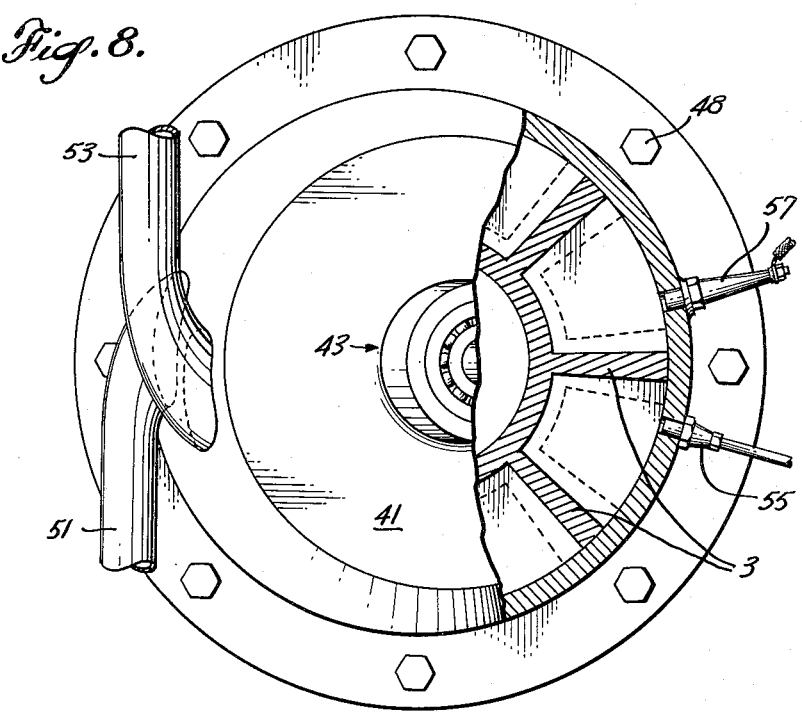
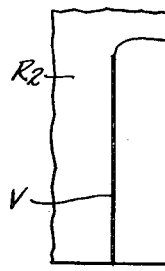 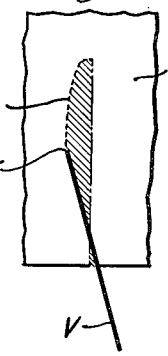 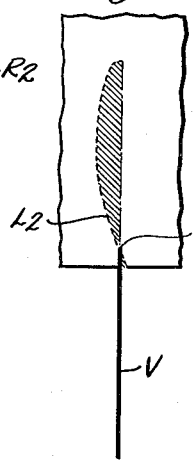 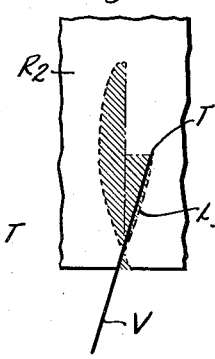 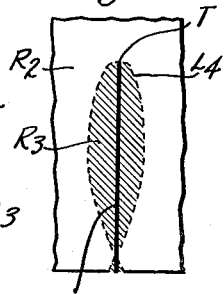
INVENTOR.
MEREDITH E. BOWDISH
BY Reynolds, Beach & Christensen
ATTORNEYS INVENTOR.
MEREDITH E. BOWDISH
BY
Reynolds, Beach & Christensen
ATTORNEYS

United States Patent Office 3,101,700
Patented Aug. 27, 1963

3,101,700
ROTARY COMPRESSOR OR ENGINE
Meredith E. Bowdish, P.O. Box 2011, Anchorage, Alaska
Filed June 14, 1960, Ser. No. 36,079
15 Claims. (Cl. 123—12)

This application relates to a rotary device which may take the form of a rotary compressor or pump, or of a rotary combustion engine operating on the two-cycle principle, or even the form of a fluid pressure motor, with appropriate modifications of construction as between different forms. It will be illustrated in two such forms, but will be described primarily as a compressor.

This application is a continuation-in-part of my application Serial No. 705,702, filed December 27, 1957, and now abandoned.

The rotary device to be described herein includes two rotor elements disposed with their axes intersecting at a given obtuse angle, and interconnected for conjoint rotation, both of the rotor elements having cooperating transverse faces, one of which is conical and cooperates with the transverse face of the other rotor element, which usually is planar, either by contacting the latter's face as in a compressor or approaching the same along a line of nearest approach, as in an engine, and at the opposite point in the cycle being separated along a line of farthest separation, one or the other rotor element—and preferably normally the conically-faced one—having radially disposed vanes angularly spaced and outstanding from its transverse face past the transverse face of the cooperating rotor element. The latter has radial recesses in its transverse face each receiving its vane, and the vane moves inwardly to the bottom of its recess and outwardly to the lips at the entrance thereof, besides oscillating its tip laterally to each side, as it moves through a cycle.

The problem in such rotary devices, whatever their use, is to maintain a seal between the relatively movable vanes and recesses, whereby each chamber between successive vanes retains and segregates the gas introduced thereinto, as the volume of each chamber changes. It is to the solution of this sealing problem that the present invention is addressed, for without adequate sealing throughout a cycle the rotary device will not function as intended.

Not only is this invention directed to effecting sealing between each vane and its recess at all times, but also it is an object to produce a mechanically strong design, capable of operating over long periods without failure. In particular, the use of a rotor element wherein closed recesses are formed, rather than mere through slots in a disk, serves the dual purposes of making the rotary device strong and rugged, and of assuring sealing at all times between the tips of the vanes within the respective recesses and the walls of such recesses, without the necessity for reliance on sealing merely at the spaced-apart lips or edges of a slot whereinto each vane enters. Sealing at the lips of the recess will at times supplement the sealing afforded herein between the tips of the vanes and the walls of their respective recesses, but primary reliance for sealing is at the tips of the vanes.

It is also an object of this invention to provide cooperating rotor elements and their vanes and recesses as indicated above, and also a design of vane which best serves the purposes stated, and avoids interference at the lips of the recess when the vane is well-entered within its recess.

By affording spacing between rotor elements along the line of closest approach, by proper disposition of intake and exhaust ports adjacent the line of farthest approach, and by proper disposition of fuel injection mechanism preferably, and ignition mechanism, in the vicinity of the line of closest approach, the present rotary device becomes an effective two-cycle rotary internal combustion engine. Conversely, by effecting contact at the line of closest approach between the conical and the planar faces of the respective rotor elements, and by proper disposition of intake and exhaust ports at the respectively opposite sides of the line of closest approach, the present device becomes an effective compressor or pump. Both such forms are illustrated in the accompanying drawings.

Enough has been said to indicate the general nature of the present invention, and the details thereof and more specific objects will become apparent from this specification, taken in conjunction with the drawings, and can be determined from the claims at the end of this specification.

FIGURES 4 and 5 are views similar to FIGURES 2 and 3 respectively, but illustrating the invention embodied in a rotary engine.

FIGURE 8 is in part a transverse section and in part an elevation along an axis, the viewpoint being shown at 8—8 in FIGURE 5.

Figure 1:
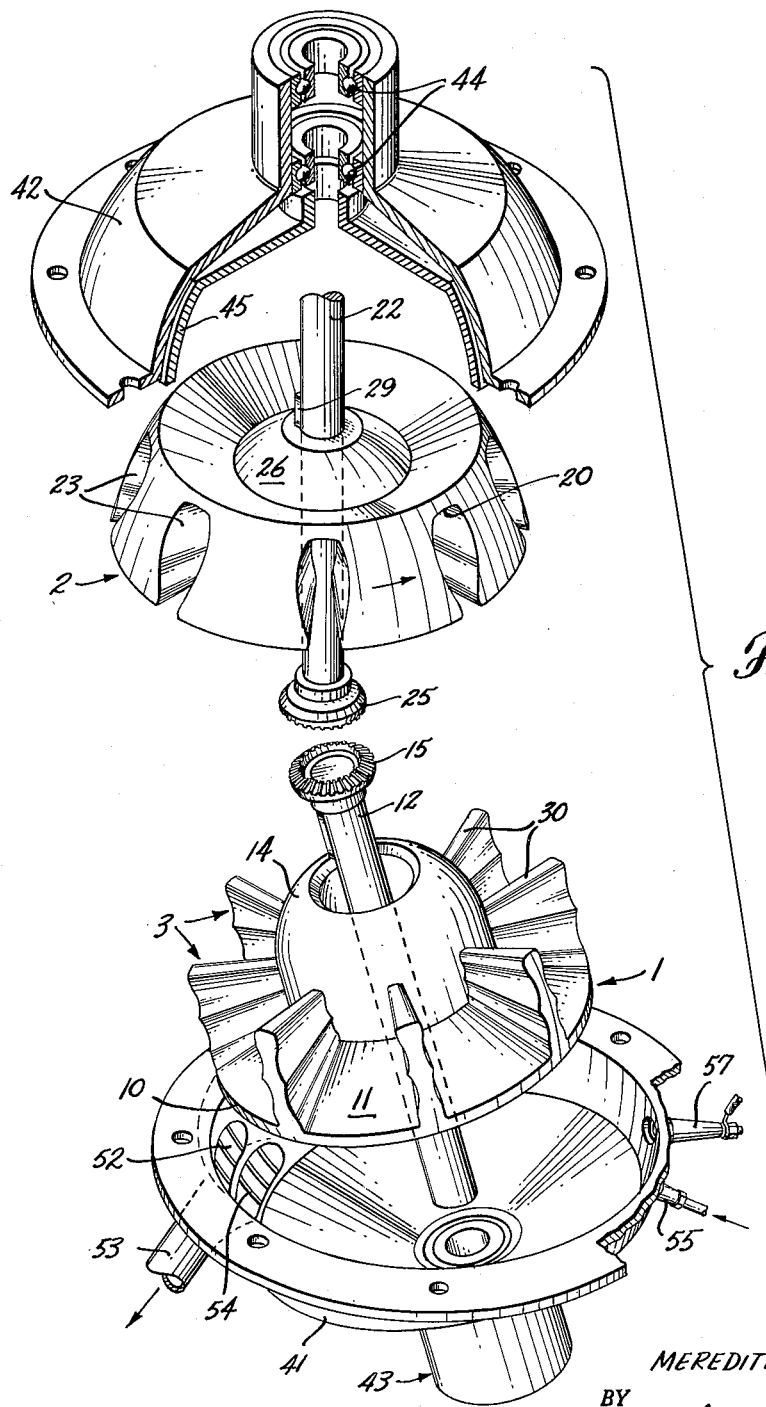
FIGURE 1 is an exploded isometric view of the individual parts of the rotary engine, parts of the casing being broken away to illustrate interior construction.

FIGURES 9 to 13 inclusive illustrate the manner in which the tip of a vane of zero breadth would define a complemental recess, in its movement through successive positions.

FIGURES 14 to 19 inclusive illustrate how a vane of a given or finite breadth will define a complemental recess, according to the present invention, in its movement through successive positions.

Two rotor elements are employed, indicated generally by the numerals 1 and 2. The rotor element 1 is formed primarily as a disk 10, having a conical face 11, and provided with vanes 3 outstanding at the conical face of the disk. These vanes are immovable relative to the disk, and are disposed in radial planes which coincide with the rotor's axis of rotation. This axis of rotation would commonly be defined by a shaft 12, which is keyed to or otherwise fixed for rotation with the rotor element 1. Further details of the rotor element 1 will be described hereinafter.

The rotor element 2 is a thickened disk formed with a planar face 21, and with recesses 23 radially disposed in and entering from the planar face 21 at angular spacings to receive the respective vanes 3. The shape and other details of these recesses 23 will be described more fully hereinafter. The rotor 2, like the rotor 1, is fixed to rotate with a shaft, designated by the numeral 22.

The two rotor elements 1 and 2 are arranged for conjoint rotation, but with their respective axes of rotation disposed at a slight obtuse angle, and intersecting at a given point. They are supported for rotation within a housing composed, conveniently, of the two halves 41 and 42, joined by the bolts 48, these two housing halves enclosing, respectively and roughly, the rotors 1 and 2. Bearings, as indicated at 43 and 44, support the respective shafts from the housing halves for rotation, and the housing is so arranged that the bearings 43 and 44 have their axes disposed at the chosen relative angle between the shafts 12 and 22, and intersecting at the central point in the plane of the planar surface 21 of rotor 2. Conjoint rotation of the two rotor elements might be accomplished through the medium of an external connection between them, or by the interengagement of the vanes 3 within the recesses 23, but it is preferred that these vanes be not so stressed and that the rotors be otherwise connected for conjoint rotation. This can be effected in a number of ways, for example, by the employment of bevel gears 15 and 25 upon the respective shafts 12 and 22, the bevel gears centering about the point of intersection of the two shafts and being continuously in mesh.

The outer radial edges or tips 30 of the vanes 3 are inclined in the radial direction so that they converge to the point of intersection of the two axes of rotation. The exterior ends of the vanes are also preferably portions of the surface of a sphere centered about the point of intersection. The vanes cannot extend wholly to the point of intersection, since they would interfere with the gears 15 and 25, hence they stop short of the center at a spherical dome 14, which is hollow and which encloses the gears 15 and 25. The bottoms 20 of the recesses 23 likewise converge to the point of intersection of the axes, but these recesses extend inwardly only to the dome 14, which is of sufficient height to close the inner ends of the recesses in all positions of the rotor elements. A complemental recess in the dome structure 26 of the rotor 2 completes the enclosure of the space wherein are the gears 15 and 25. A liner 45 closes the outer ends of the recesses 23. This liner 45 is keyed at 29 to and rotates with the rotor element 2, and in addition to sealing the outer ends of the recesses 23, the liner 45 encloses and prevents distortion of the recessed, and so slightly weakened, rotor element 2. The liner could be omitted, and the rotor element 2 would then be machined to be a running fit within the housing half 42.

Figure 2:
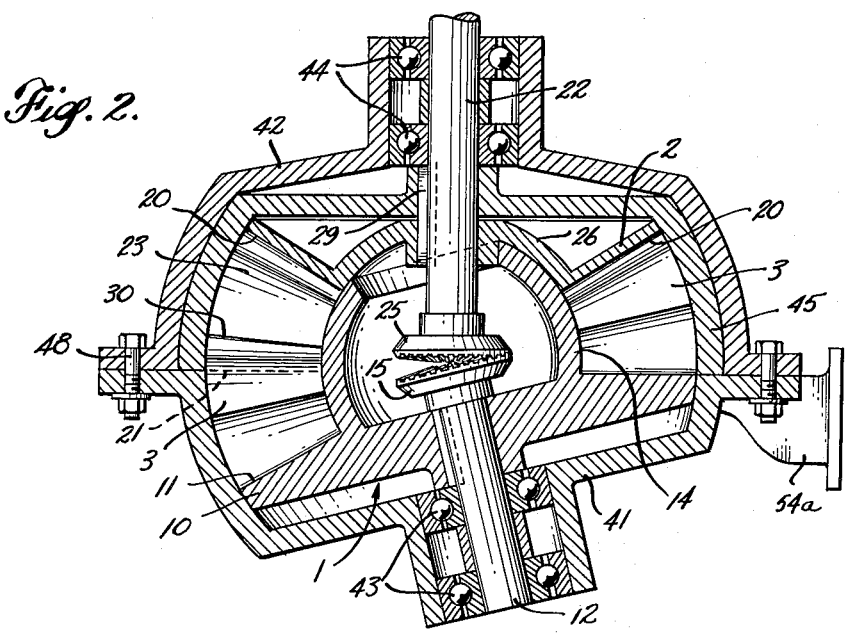
FIGURE 2 is an axial sectional view through the compressor, wherein the rotor elements themselves are shown in section.
Figure 3:
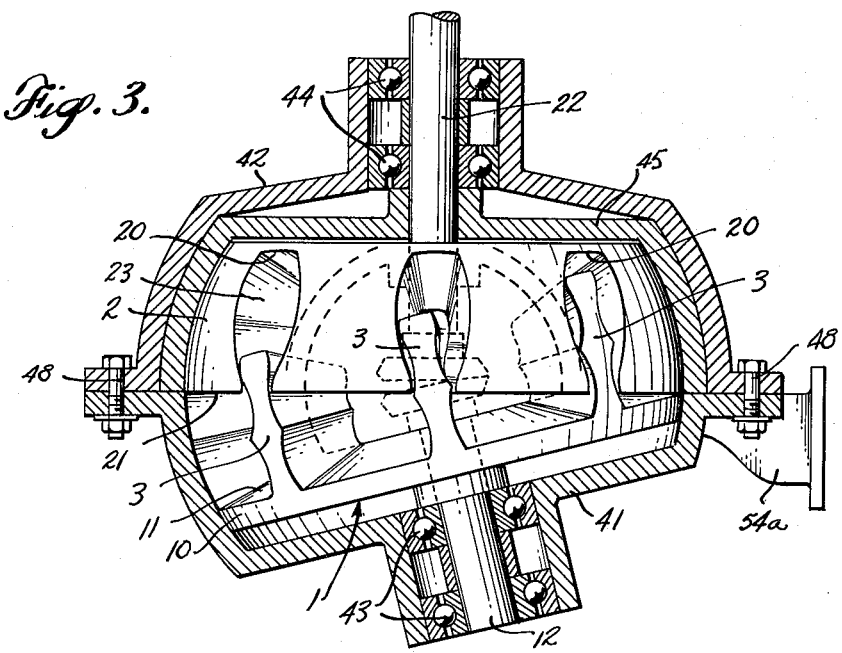
FIGURE 3 is a similar view but with the rotor elements shown in elevation.
Figure 6:
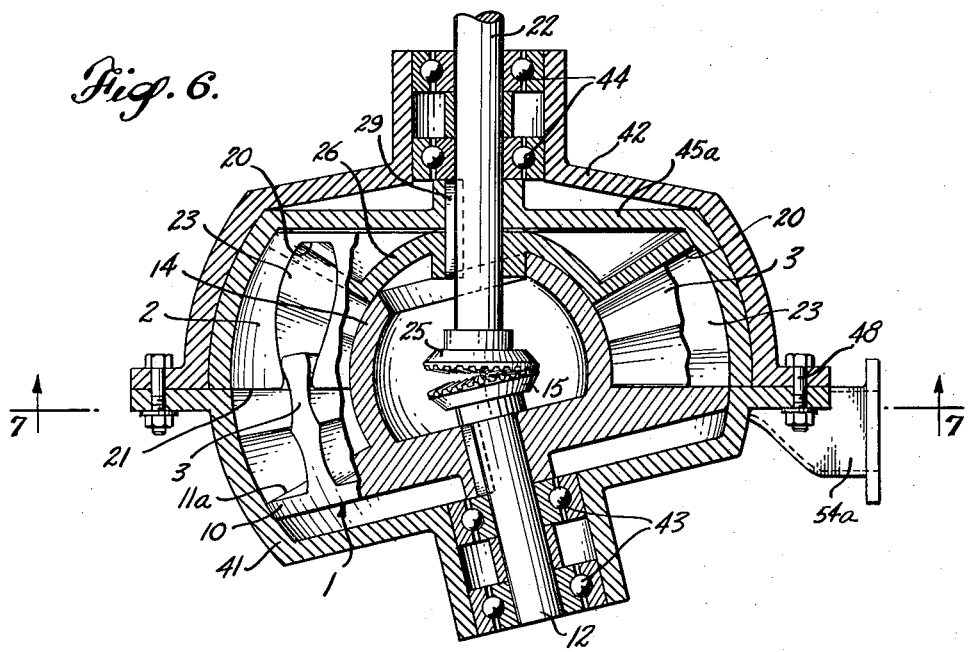
FIGURE 6 is an axial sectional view similar to FIGURE 2, at the line 6—6 of FIGURE 7.
Figure 7:
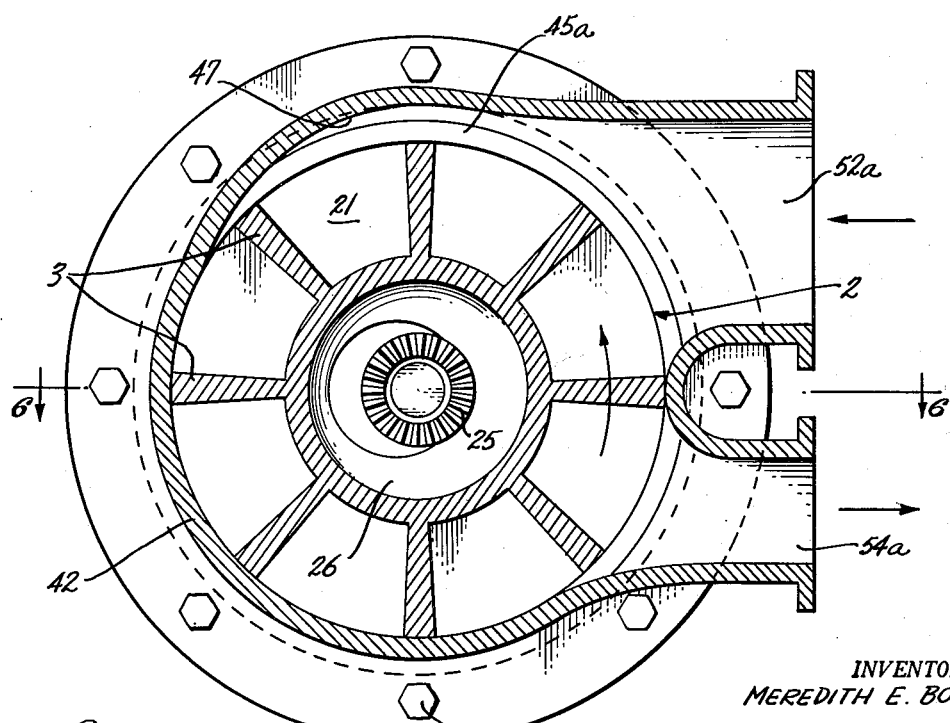
FIGURE 7 is a transverse section approximately on the plane indicated at 7—7 of FIGURE 6.
Figure 14:
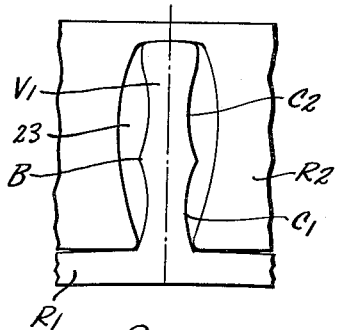
Figure 15:
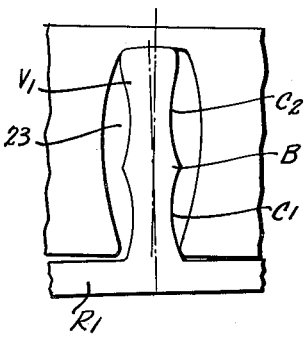
Figure 16:
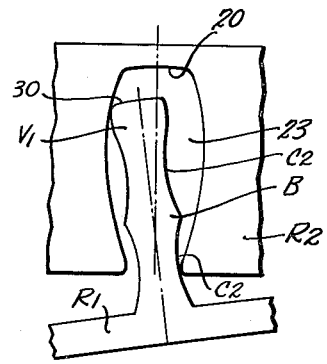
Figure 17:
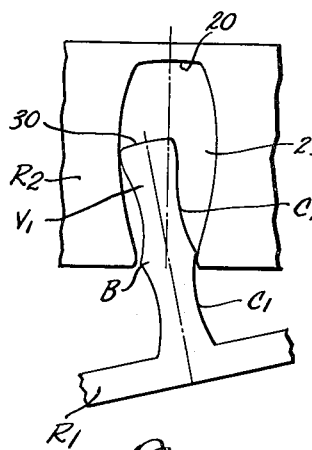
Figure 18:
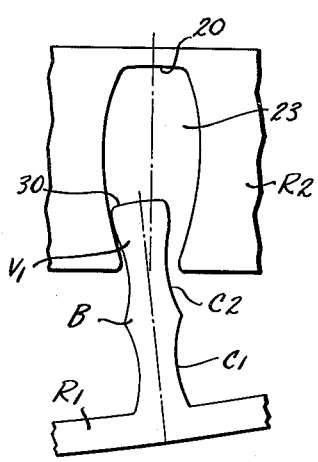
Figure 19:
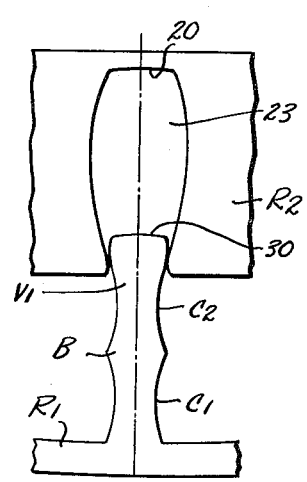

The rotary device when intended primarily as a compressor, has the slope of its conical face 11 of the rotor 1 such as to contact the planar face 21 of the rotor 2 along the line or radius of closest approach of these two surfaces, as shown at the right in FIGURES 2 and 3. Diametrically opposite, at the line of farthest separation, or at the left in the same figures, these two faces are spaced well apart, and their separation will vary continuously, increasing to a maximum from the line of closest approach to the line of farthest separation and decreasing in the next half cycle. By arranging for intake throughout the first half cycle, as by way of intake 52a (FIGURE 7), and discharge just in advance of the beginning of the next cycle, at 54a, intaken gas is compressed.

Were the vanes 3 to remain always in planes which include the axis of rotor element 2, the probelm of sealing them with respect to this rotor element 2 would be greatly simplified, but inamuch as they are fixed to the rotor element 7, in radial planes which include the axis of the latter, they will lie in planes that include the axis of rotor element 2 only when they arrive at the line of closest approach or at the line of farthest separation, 180° removed. Intermediate these two positions they are inclined to one side or the other of a plane through their recesses and through the axis of rotor 2, and at the same time are moving into or from their recesses. It is this oscillation of the vane that requires broadening of the recess inwardly of its entrance, yet the oscillation of the tip follows a locus which, for any given radius on the vane, can be plotted exactly.

FIGURES 9 to 13 illustrate how a vane V of zero thickness will move with respect to a rotor element R2 when the vane is fixed in the relationship indicated above to a different rotor R1 (not shown in these views, but see FIGURES 14 to 19), and the two rotor axes intersect at a given obtuse angle. FIGURES 9 to 13 in effect develop the locus of the tip of a vane under a given set of conditions. FIGURE 9 shows the vane V fully entered into its recess, with the vane and recess both in the line of closest approach. As the rotors turn, through 90°, the vane is withdrawing, and at the same time is oscillating to one side of the recess, its tip T describing a locus L1 (FIGURE 10). The exterior portion of the vane has swung to the opposite side of its original plane, outwardly of the entrance to the recess. Proceeding through 180° total rotation of the rotors, the vane arrives (FIGURE 11) at the position of farthest separation, and is again in the original plane, although now almost wholly withdrawn from the recess. In reaching this position the tip T has described the locus L2. Continuing, the vane's tip moves back into its recess, but the vane as a whole oscillates to the opposite side of the original plane, describing the locus L3 (FIGURE 12) at 270° of total rotation. Continuing, and completing 360° of rotation, the vane returns to its original plane and position, but its tip has described the locus L4 (FIGURE 13). If sealing is accomplished primarily along the loci L1, L2, L3 L4 between the tip T and the wall of the resulting recess R3, and only secondarily and in the two positions corresponding to FIGURES 7 and 11 between the vane and the entrance to the recess, there is adequate sealing of the chambers between successive vanes.

It may be considered that FIGURES 9 to 13 illustrate merely a theoretical case, with a vane of zero thickness, and that with a vane of finite thickness the same results will not follow. The dimension of thickness in the vane somewhat alters the preferred form of the vane, but FIGURES 14 to 19 illustrate that the same principles apply to the design of an actual vane, V1. Here the lips of the entrance to the recess must be far enough apart to admit the breadth of the tip 30 of the vane, but normally no farther apart, for at the line of farthest separation sealing is effected between both lips of the recess and the tip edges of the vane. This vane V1 is of a height that when the position of nearest approach (FIGURE 14) its tip T1 will sealingly engage the bottom 20 of the recess. The vane may also be of a breadth at its root to sealingly engage the opposite lips of the entrance. Intermediate its tip and its root, and preferably at the midpoint, the vane is bulged at B on each side, but to a breadth no greater than the width of the entrance. Between the bulge and the root of the vane the faces of the vane are inwardly curved, the curvature being such that as the vane withdraws through the first 90° from the position of FIGURE 14 the curve C1 will clear or will wipe one lip of the entrance, and the same result will follow during the last 90° of the vane's inward movement; see FIGURES 15 (20°), 16 (60°) and 17 (90°). At the 90° point the bulge B will exit from the recess and the faces of the vane are inwardly curved, at C 2, between its bulge and its tip, sufficiently to clear the lips of the recess. The tip 30 at its edges will at all times contact the wall of the recess, for sealing, as explained in connection with FIGURES 9 to 13; at the 180° position (FIGURE 19) the tip seals relative to the two lips, and having followed down one side wall of the recess begins to follow up the opposite side wall. At the zero position (FIGURE 14) the tip 30 bottoms within the recess, and the bottom 20 of the recess is slightly broader than the breadth of the tip 30, to accommodate its lateral oscillation.

It may be said that the relative angularity of the axes of rotor elements 1 and 2, and whether or not they contact along the line of closest approach, primarily governs the locus of the tip edges of the vane, but that for each condition the tip is constrained to follow a locus that is determinable. If the recess wall lies in that locus, the tip of the vane will sealingly engage the recess wall throughout a cycle of rotation, and if additional sealing is obtainable, as between the surface of the vane and the lips, in the first and last 90° from and to the position of closest approach, this sealing is secondary. In prior attempts known to me the sealing has been attempted only at the lips of a slot through which the vane projects, and there has been no recess wall with which the tip of the vane might make sealing contact, and so the sealing was ineffective, for as FIGURES 9 to 13 show the lips cannot closely embrace the vane throughout the cycle.

It may be pointed out that if the device is to function as a compressor (FIGURES 2 and 3) sealing engagement between each vane and its recess is only important during the compression half-cycle, and not during the intake half-cycle. It is therefore possible to employ the novel principle of this invention in a compressor wherein sealing contact between the vane's tip and its recess wall is effective throughout the compressive portion only of the cycle. It will appear later that communication about the exterior of each chamber and with the intake persists until compression is about to begin, hence sealing as between chambers will effect no useful result, although it would usually occur.

Chambers are defined between the successive vanes and between the approaching or receding surfaces 11 and 21, which are sealed in the manner indicated, and which progressively vary in volume throughout a cycle. The variation in their volume can serve to compress gases, as in a compressor, or for expansion of gases, as in an engine. It only becomes necessary to provide for intake and for discharge of gases, and for supply of fuel and ignition of an air-fuel mixture, if operating as an engine. The housing part 41, all of which is to one side of the plane of the planar face 21, is provided with all the agencies for intake, exhaust, fuel supply and ignition. A duct 51 suitably located and leading to an interior port 52 adjacent or just past the line of farthest approach of the rotors, serves for intake of air to be compressed in the compressor as the chambers decrease in size toward the line of closest approach. A second duct 53, leading from a port 54, communicates with the interior of the housing just ahead of or coincident with the point where the intake port 52 admits to the interior for discharge or exhaust. Both of these are in the vicinity of the line of farthest separation. Each may include diffusers for control of the gas. Diametrically opposite, in the rotary engine, in the vicinity of the line of closest approach, a fuel injector 55 of any suitable form or character admits to the interior of the housing, the fuel being supplied under pressure by a pump diagrammatically indicated at 56, suitably driven from one of the shafts of the engine. Carburetion means might be substituted therefor, and are intended to be comprised within the term "injector," but normal carburetors are considered less suitable than a simple injector. Ignition is accomplished by suitable ignition means, as for example the glow plug 57. Normally the fuel injector nozzle 55 would be just in advance of the line of closest approach in the sense of rotation, and the igniter plug 57 would be just past the line of closest approach.

While either a glow plug or a spark plug is intended to be comprised within the term "glow plug," it is considered preferable to employ a continuous glow plug rather than to employ a spark plug and means to time it, and to employ continuous fuel injection, rather than timed injections, due to the fact that the engine may be formed with, for example, eight separate chambers, and if the engine is rotating at even moderate speeds, this speed times the number of chambers would require an exceptionally large number of individual fuel injections and spark plug discharges, and it would be difficult to time these. Alternatively, there might be a succession of fuel injector nozzles and/or igniters, distributed angularly in the vicinity of the line of closest approach, and timing might be achieved by utilizing different ones, at such angular locations as are best suited to the engine speed.

Describing first the operation of the compressor (FIGURES 2, 3 and 7), air is intaken at 52a as the chambers increase in volume, the recess 47 about the exterior of each chamber extending almost to the line of farthest separation, and intake ceases at about the line of farthest separation. As rotation continues the air is compressed as each chamber is sealed, and the volume of each chamber lessens, and the compressed air discharges at 54a. The contact between faces 21 and 11 of the rotors at the line of closest approach constitutes a seal between intaken low pressure air and discharging compressed air.

Describing next the operation of the engine, air is admitted at 52 where the volume of each chamber is largest, and as the rotor elements rotate the chambers become smaller in volume as they approach the line of closest approach. The air is thereby compressed to whatever degree is required by the design, and specifically by the spacing between the faces 11 and 21 of the two rotors. Adjacent the line of closest approach, fuel is injected into the compressed air within the chamber, and immediately this compressed fuel-air mixture is ignited by the glow plug 57, and its expansion urges the chamber to expand, causing rotation of the rotors. When the line of farthest separation is reached, or even before, exhaust is accomplished through the port 54 and air is again intaken at 52, recommencing the cycle. It would normally be arranged that the air in entering scavenges the remainder of burned gas within a given chamber.

At all times, the shape of and contact between the individual vanes 3 and their recesses 23 serve for adequate sealing. If because of wear any gas should escape from a chamber at one face of a vane, it can only escape into the following chamber, which also is being compressed, and the loss in the first chamber is inconsequential.

I claim as my invention:

1. In a rotary device of the character described, a pair of rotors mounted in end-to-end relationship for conjoint rotation, their axes of rotation being inclined to one another at an acute angle and their ends having cooperating central portions forming a sliding seal therebetween, the end of one rotor having a series of recesses therein spaced angularly about the central portion thereof and the end of the other rotor having a corresponding series of vanes spaced in similar angular relation about the central portion thereof and each extending operatively into one of the recesses to form a series of chambers between pairs of corresponding vanes and recesses, each of the corresponding vanes and recesses having mutually opposing concavely-shaped walls terminating, in the case of the vane, at the tip portion thereof and in the case of the recess, at the mouth portion thereof, said acute angle being so chosen that the locus generated by the vane tip portion as the rotors are rotated conforms with the contour of the concavely-shaped recess wall, thereby forming a sliding seal between chambers.

2. A rotary device according to claim 1 wherein the concavely-shaped recess wall has such an extent in directions parallel to the rotational axis of said one rotor that the contour thereof coincides with substantially the full locus generated by the vane tip portion during a half cycle thereof.

3. A rotary device according to claim 2 wherein said vane has opposite concavely-shaped walls terminating at the tip portion thereof and said recess has corresponding opposite concavely-shaped walls terminating at the mouth portion thereof, said acute angle being so chosen that the locus generated by the vane tip portion as the rotors are rotated conforms with the sequential contour of the concavely-shaped recess walls.

4. A rotary device according to claim 3 wherein the angular thickness of the vane at its tip portion is substantially equal to the angular width of the mouth portion of the recess.

5. In a rotary device of the character described, a pair of rotors mounted in end to end relationship for conjoint rotation, their axes of rotation being inclined to one another at an acute angle and their ends having cooperating central portions forming a sliding seal therebetween, the end of one rotor having a series of recesses therein spaced angularly about the central portion thereof and the end of the other rotor having a corresponding series of vanes spaced in similar angular relation about the central portion thereof and each extending operatively into one of the recesses to form a series of chambers between pairs of corresponding vanes and recesses, each of said vanes having opposite concavely-shaped walls terminating at the tip portion thereof and each of the recesses having corresponding opposite concavely-shaped walls terminating at the mouth portion thereof, said acute angle being so chosen that the locus generated by the vane tip portion as the rotors are rotated conforms with the sequential contour of the recess walls, thereby forming a sliding seal between chambers.

6. A rotary device according to claim 5 wherein the angular thickness of each vane at its tip portion is substantially equal to the angular width of the mouth portion of the recess into which it extends.

7. A rotary device according to claim 6 wherein the recesses and vanes are so relatively sized that, as the rotors are rotated, the respective recess and vane at the point of closest approach sealingly engage at the bottom and tip thereof, respectively, and the respective recess and vane at the point of farthermost separation sealingly engage at the mouth and tip portions thereof, respectively.

8. A rotary device according to claim 7 wherein the outer peripheral portions of the rotor ends cooperate to form a sliding seal therebetween as the rotors are rotated.

9. In a rotary device of the character described, a pair of rotors, casing means defining a chamber in which the rotors are mounted in end-to-end relationship for conjoint rotation, their axes of rotation being inclined to one another at an acute angle and their ends having cooperating central portions forming a sliding seal therebetween, the end of one rotor having a series of recesses therein spaced angularly about the central portion thereof and the end of the other rotor having a corresponding series of vanes spaced in similar angular relation about the central portion thereof and each extending operatively into one of the recesses to form a series of subchambers between pairs of corresponding vanes and recesses, each of said vanes having opposite concavely-shaped walls terminating at the tip portion thereof and each of the recesses having corresponding opposite concavely-shaped walls terminating at the mouth portion thereof, said acute angle being so chosen that the locus generated by the vane tip portion as the rotors are rotated conforms with the sequential contour of the recess walls, thereby forming a sliding seal between subchambers.

10. A rotary device according to claim 9 wherein the rotors cooperate with the wall of the chamber to form a sliding seal therebetween and said chamber wall has inlet and outlet ports therein arranged to alternately admit fluid to and exhaust fluid from the subchambers as the rotors are rotated.

11. A rotary device according to claim 10 wherein the chamber wall also has fuel ignition means mounted therein circumferentially between the inlet and outlet ports.

12. A rotary device according to claim 9 wherein the rotors are geared together for conjoint rotation.

13. A rotary device according to claim 9 wherein the cooperating central portions of the rotor ends include a central dome on the end of said other rotor and a complemental central recess in the end of said one rotor.

14. In a rotary device of the character described, a pair of rotors, casing means defining a chamber in which the rotors are mounted in end-to-end relationship for conjoint rotation, their axes of rotation being inclined to one another at an acute angle and their ends having cooperating central portions forming a sliding seal therebetween, the end of one rotor having a series of recesses therein spaced angularly about the central portion thereof and the end of the other rotor having a corresponding series of vanes spaced in similar angular relation about the central portion thereof and each extending operatively into one of the recesses to form a series of subchambers between pairs of corresponding vanes and recesses, opposite walls of each of the vanes having a succession of concavely-shaped indentations extending radially outwardly therealong and separated from one another by a ridge, the outermost of said indentations terminating in end ridge, on the tip portion of the vane, each of the recesses having corresponding opposite concavely-shaped walls terminating in opposing end lips at the mouth portion thereof, said acute angle being so chosen that as the rotors are rotated, on one hand, the loci generated by the vane end ridges conform with the contour of the recess walls and, on the other hand, the loci generated by the recess lips conform with the contour of vane indentations on alternate sides of the vane, thereby forming a sliding seal between subchambers.

15. A rotary device according to claim 14 wherein the vane indentations lying along the loci of the recess lips are those adjacent the outermost indentations.

References Cited in the file of this patent

UNITED STATES PATENTS

| 32,372 | Jones et al. | May 21, 1861 |
| 739,207 | Nielsen | Sept. 15, 1903 |
| 1,056,400 | Bylger | Mar. 18, 1913 |
| 1,912,634 | Gray | June 6, 1933 |
| 2,101,051 | Cuny | Dec. 7, 1937 |
| 2,101,428 | Cuny | Dec. 7, 1937 |
| 2,242,058 | Cuny | May 13, 1941 |
| 2,318,386 | Haines | May 4, 1943 |
| 2,674,952 | Jacobsen | Apr. 13, 1954 |
| 2,691,349 | Cuny | Oct. 12, 1954 |
| 2,828,695 | Marshall | Apr. 1, 1958 |

FOREIGN PATENTS

| 6,221 | Great Britain | of 1832 |